Nov. 6, 1962 W. A. LOSEY 3,062,153
METHOD OF AND MEANS FOR PUMPING VARIOUS KINDS OF MATTER
Filed Jan. 25, 1961 2 Sheets-Sheet 1

INVENTOR.
William A. Losey 3,062,153
METHOD OF AND MEANS FOR PUMPING
VARIOUS KINDS OF MATTER
William A. Losey, 1401 Floyd Ave., Sunnyvale, Calif.
Filed Jan. 25, 1961, Ser. No. 84,904
5 Claims. (Cl. 103—152)

My invention relates to a new and useful method and means for pumping various kinds of fluid and other yieldable matter and is a modification of my previous patent application Serial No. 291,114, filed June 2, 1952, now abandoned.

This invention has for its object the provisions of a novel, simple and effective form of pump which is particularly applicable to the expulsion of fluids or other matter from a non-prepressurized storable container; which may be used in the line of a processing plant for the blending or combining of chemicals not suitable to direct pumping by more conventional means, or readily transferable from one source to another due to contamination or other cause, by utilizing bottled pressure or by utilizing pressure or vacuum derived from other standard equipment. It should be understood, however, that its uses are not confined or limited to such purposes.

The principal object of the present invention is to provide a reliable method and means for the expulsion of effluent matter from a flexible member within a container through a port at one end portion without causing the matter to become entrapped, nor combining the pumping agent with effluent matter.

Another object of the present invention is to provide a container with a flexible member for storing yieldable matter, and a method and means by which longitudinally progressive systolic action of the flexible member may be uniformly effected to form a plurality of flexible faces, which longitudinally advance to discharge effluent matter uni-directionally.

A further object of this invention is to provide a container with a flexible bladder and a method and means of predetermining in advance where the flexible bladder shall fold to avoid stretching, while being acted upon by a fluid or gaseous agency under pressure during the expulsion of effluent matter.

A still further object of the invention is to provide a tubular flexible member of resilient material with hemispherical ends in order to avoid stretching the end portions of the flexible member by predetermining that each segment between longitudinal ribs of the member shall progressively fold inwardly, and in lesser amounts, at each hemispherical end point of attachment with the axial ports of an externally rigid container having the same general configuration as the flexible member, while being acted upon by any pressure source applied to the cavity between the flexible member and the container through a suitable port in the latter.

A special object of the invention is to provide an expandable preformed flexible bladder member, having predetermined inwardly projecting webbed segments folded into juxtapositional relationship between integral ribs 120 degrees apart relative to the axis thereof, which longitudinally extend from radially converging points of intersection with tubular ports at each end portion of the bladder member. Each tubular member may be flareably engaged within the bore of a ported opening of an external casing, or otherwise sealably engaged thereto, as in effect to provide two non-connecting chambers; one of which chambers has a valve controlled inlet and outlet, and the other which is provided with a port for connecting to a source of pressure or vacuum (as the case may be). The arrangement being such that when vacuum is applied to the external chamber, while or prior to affluent matter being introduced to the inner chamber through one of the aforementioned valve ports of the flexible member, the latter will unfold outwardly from juxtapositional relationship to become an unstressed hemispherically ended tubular member within the outer pump casing for storing gas, fluid or other yieldable matter; from which expulsion may be accomplished by pressurizing the chamber between the bladder member and pump casing from an external source of bottled pressure, or other conventional means.

A still further object of the invention is to provide a tubular flexible member of resilient material with hemispherical ends in order to avoid stretching the end portions of the flexible member by predetermining that each 120 degree segment, folded inwardly between longitudinal ribs of the member, shall progressively unfold outwardly and, in lesser amounts, at each progressively forming hemispherical end point of attachment with the axial ports of an externally rigid container; while being acted upon by any pressure source applied to the cavity within the flexible member through a suitable port in the latter.

Another object of the invention is to provide a hemispherically ended container having a flexible metallic liner in the form of a frustrum of a cone with hemispherical ends and provided with integral ribs extending longitudinally, which are positioned 120 degrees apart and parallel to the axis to predetermine repeatable folding characteristics for each webbed segment of the liner to a point of attachment with the surrounding container.

A still further object of the present invention is to provide a container with a metallic membrane of yieldable material conforming to the inner dimensions of the confining container for the storage of any affluent matter for indefinite periods of time; so that when an outside agency, such as gas or fluid under pressure, is introduced between the container and the membrane, the latter will fold inwardly in predetermined juxtapositional folds without stretching while forcibly expelling the effluent matter without entrapment of the contents during folding of the membrane to the container's axis.

Broadly speaking, however, the invention may be said to consist in a pump comprising a pump casing having hemispherical ends and a resilient or flexible bladder member contoured to the casing, or like member normally free of stresses due to tension or compression, and so located within said casing as in effect to provide two non-connecting chambers; one of which chambers has a valve controlled inlet and outlet, and the other which is provided with a port for connecting to a source of vacuum or pressure, or alternate pressure and vacuum (as the case may be); the arrangement being such that when subjected to the influence of pressure, the bladder member by its resultant flexible folding movement effects the requisite expulsion pumping action.

With the foregoing objects in view together with such other objects and advantages as may subsequently appear, the invention resides in the parts and in the combination, construction and arrangement of the parts hereinafter described in the following specifications, particularly pointed out in the claims forming a part hereof and illustrated in the accompanying drawings, in which:

Figure 1:
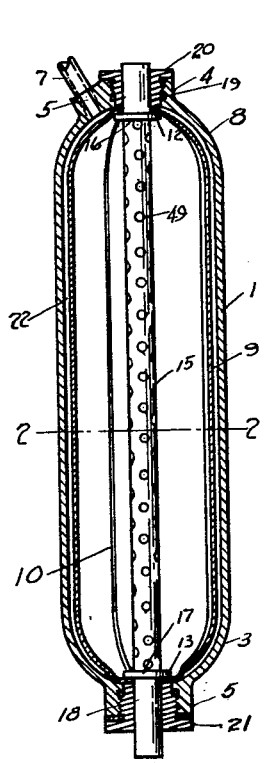
FIG. 1 is a longitudinal section of a pump embodying the present invention.
Figure 2:
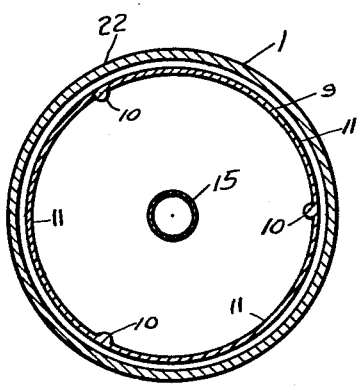
FIG. 2 is a cross-sectional view taken on line 2—2 of FIG. 1 showing the pump in the unpressurized position.

Referring to the drawings, FIGS. 1 to 6 show a hemispherically ended housing 1 having a female threaded boss 6 on hemispherical end 3, and a female threaded boss 4 having adjacent thereto a port 5 provided with pipe 7 threaded therein on hemispherical end 8. The joining of end 8 to housing 1, by welding or other conventional means, follows the positioning within the housing 1 of hemispherically ended bladder 9 having longitudinally extending and inwardly projecting ribs 10 which are located 120 degrees apart as shown in FIG. 2 normal to the longitudinal axis and interconnecting webs 11. The foregoing ribs and webs coverage at each of the hemispherical end portions and integral thereto to a point of tangency with female flanges 12 and 13 normal to the bladder axis. Longitudinally positioned within the bladder 9 is a perforated tubular member 15 having integral male flanges 16 and 17 positioned on each end portion 18 and 19 for mating with the internal faces of flanges 12 and 13 of the bladder member 9, as shown in the fragmentary view FIG. 4. Threaded bushings 20 and 21 serve to clamp the interfaces of the flanges 12 and 13 of the bladder member 9 between flanges 16 and 17, respectively, of the tubular member 15 providing an effective seal between the contents within the bladder member 9 and the operating pressure medium applied to the cavity 22 through port 5 from an external pressure source connected to pipe 7 of FIG. 1.

Figure 5:
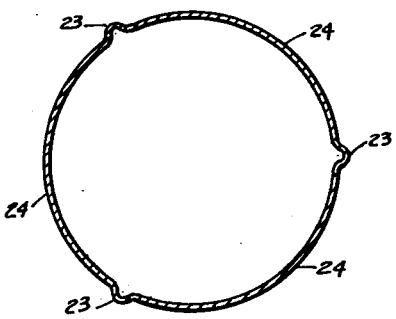
FIG. 5 is a cross-sectional view of a modified flexible member as formed.

As shown in FIG. 5, a modified cross-sectional form of the flexible bladder hereof retains the basic thickness of the member in the forming of outwardly projecting U-shaped ribs 23 which are circumferentially 120 degrees apart and interconnected to the webbed sections 24.

Figure 7:
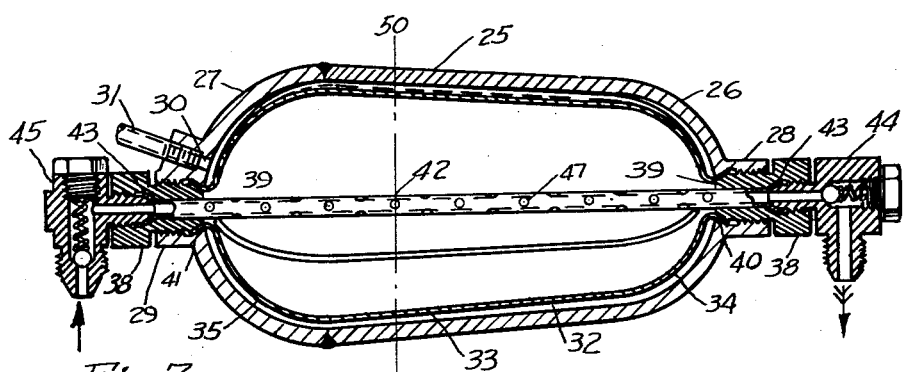
FIG. 7 is a longitudinal sectional view of a particular modified form of the pump embodied in the present invention.
Figure 9:
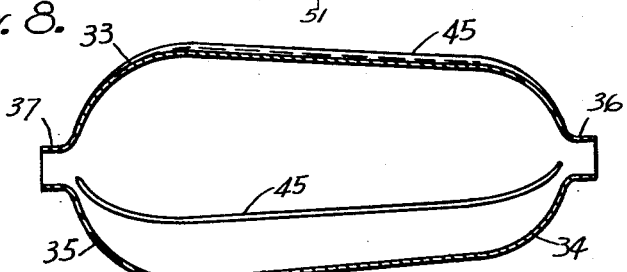
FIG. 9 is a longitudinal sectional view of the modified flexible member in the as formed condition prior to placement in the housing as shown in FIG. 7 and FIG. 8.

An important feature of this invention is the modified pump shown in FIG. 7, which includes a housing 25 in the form of a frustrum of a cone with hemispherical ends 26 and 27, having a female threaded boss 28 on the smaller end 26 with the larger hemispherical end 27 provided with a female threaded boss 29 and adjacent thereto a port 30 provided with a pipe 31 threaded therein, for introducing fluid or gas under pressure to the cavity 32 between the housing 25 and a flexible tubular member 33 therein, having the form of a frustrum of a cone with hemispherical ends 34 and 35 provided with integral tubular extensions 36 and 37, respectively, as shown in FIG. 9.

Figure 8:
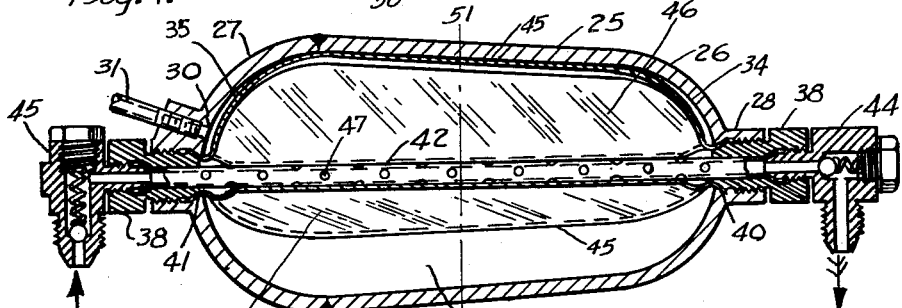
FIG. 8 is a longitudinal sectional view of the modified pump similar to FIG. 7, showing the flexible member in the fully folded position after pressurization.

Accordingly, prior to joining the housing 25 together by welding or other conventional means, the flexible member 33 is positioned within the housing 25, as shown in FIG. 7 and FIG. 8, and sealably joined to the housing end portions 28 and 29 by flaring the tubular end portions 36 and 37 onto conical seats within the threaded bore of the bosses 28 and 29; wherein are threaded conventional tubular bushings 38 with conical ends 39 sealably engaged with the flared ends 40 and 41 to form a gas tight chamber between the housing 25 and the bladder member 33. A perforated discharge tube 42 extends longitudinally on the axis of the housing 25 to and within the bore of fittings 38, which have been modified to have conical surfaces 43 within to engage the flared end portions of the discharge tube 42 and to receive threadably conventional check valves 44 and 45 conical ends, having one conical end portion sealably engaged with the flared ends 40 and 41 of the discharge tube 42.

The feathered arrows indicate direction of effluent flow of matter, affluent flow of the matter being indicated by unfeathered arrows.

Figure 10:
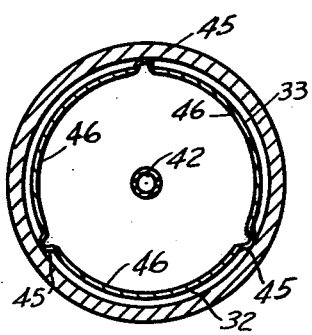
FIG. 10 is a cross-sectional view taken on line 50—50 of FIG. 7 prior to pressurization.

Longitudinal V-shaped ribs 45 positioned 120 degrees circumferentially apart and interconnected by webbed sections 46 molded or formed integrally together as shown in FIG. 9 and FIG. 10, extend the length of the flexible expulsion member 33 to a point of intersection with each of the tubular members 36 and 37.

Figure 11:
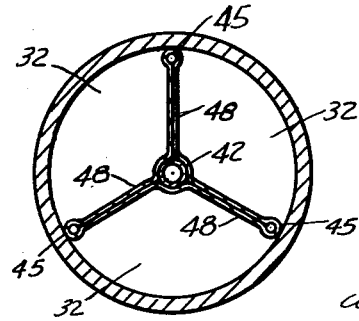
FIG. 11 is a cross-sectional view taken on line 51—51 of FIG. 8 showing the flexible member in the fully folded position after pressurization of the chamber between the housing and the flexible bladder member.

Accordingly, when the operating medium from any conventional pressure source is connected to the pipe 31, fluid or gas under pressure is admitted through the port 30 to the cavity 32; the tubular expulsion member 33 yields to the application of pressure and folds inwardly, constricting around the discharge tube 42, as shown in FIGS. 8 and 11, to fully expel the effluent matter from the flexible expulsion member 33 through a series of small holes 47 spaced circumferentially around and longtudinally along the discharge tube 42. Further, more, it is to be noted that each longitudinally ribbed portion 45 of constant wall section 46 becomes a flexible pivot for the adjacent webbed portions 46 during folding, which progresses longitudinally and inwardly from the larger hemispherical end 35 with a plurality of flexible faces toward the smaller hemispherical end 34 due to the greater span of the webbed sections at the larger end. In the fully folded position in FIGS. 8 and 11, the three radially disposed folds 48 are in juxtaposition with each half of the adjacent folds 48 while constricting around the discharge tube 42.

Figure 4:
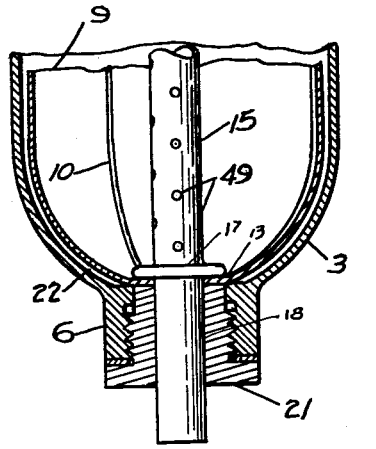
FIG. 4 is a fragmentary sectional view similar to FIG. 1 showing the position of the parts to effect sealing the unit tight before or after pressure is applied.

In the operation, a pump as described above may be as follows:

Assuming the flexible expulsion member 9, as shown for example in FIG. 1, FIG. 2 and FIG. 4 of the drawings, contains affluent matter from any source whatsoever and it being desired that the whole or a part thereof is to be expelled therefrom for use in any manner whatsoever, an external pressure source is connected to the port 5 through pipe 7; with the pressure source thus connected, it is a matter of choice or design requirement whether or not to control the rate at which the pressure is to be introduced to the cavity 22. Upon admission of pressure, the cavity 22 undergoes uniform pressurization throughout which results in each webbed segment 11, thereof, pivotably folding inwardly along each of the longitudinal ribs 10 causing the effluent matter to flow through a series of small holes 49 longitudinally positioned along the discharge tube 15 and expulsion of the contents therefrom for use in any manner desired.

Figure 3:
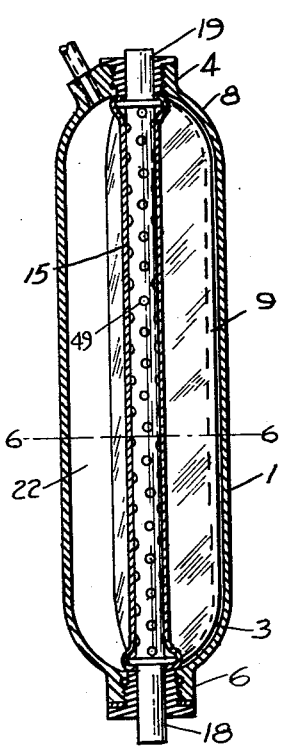
FIG. 3 is a longitudinal section similar to FIG. 1 showing the pump in the fully pressurized position.
Figure 6:
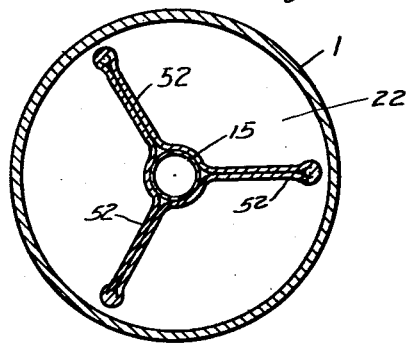
FIG. 6 is a cross-sectional view taken on line 6—6 of FIG. 3 showing the position of the parts in the pressurized position.

In the fully folded position shown in FIG. 3 and FIG. 6, the flexible member 9 has constricted fully around the discharge tube 15 with each of the adjacent folded portions 52 in juxtapositional relationship.

Operation of the pump shown in FIGS. 7 to 11 of the drawings is essentially the same as outlined above for FIG. 1, differing only in the action of the flexible member during the expulsion cycle. Accordingly, when pressure is applied to the cavity 32 through the pipe 31 threaded into port 30, the cavity is uniformly pressurized causing folding of each webbed segment 46 of the member 33 about each longitudinal rib 45, with segments 46 progressively folding from the larger end portion 35 and from a point having the greatest span between each of the ribs 45 to an end point on the smaller end 34; thereby presenting a longitudinal plurality of moving faces in juxtapositional relationship during the systolic action of the flexible member to cause expulsion of the effluent matter from the remaining confines of the bladder system without entrapment of affluent matter and thereby preventing tearing of the flexible member during any portion of the expulsion cycle.

The hemispherical ends 33 and 34 have been provided to reduce the folding requirements during systolic action, thereby providing the means for diastolic action of the flexible member for another or repeating cycles as desired; accordingly, though not specifically shown connected to a supply source, it is contemplated that reasonable men would employ said repeating cycles if the requirements so dictated.

Various modifications may be made to the invention without departing from the spirit thereof or scope of the appended claims.

What I claim is:

1. A pump comprising a longitudinally extending casing having oppositely disposed end sections, each of said end sections having a hemispherical configuration and having an opening therein, a longitudinally extending conduit having the respective ends thereof connected to the respective openings in said end sections, said conduit having openings disposed along the length thereof, a longitudinally extending bladder having oppositely disposed end sections, each of the sections of said bladder having a hemispherical configuration and an opening therein, said bladder consisting of flexible material and having three ribs formed in said flexible material and disposed 120 degrees apart, each of said ribs extending along the surface thereof and for entire length of said bladder, said longitudinally extending bladder being disposed in and spaced from said longitudinally extending casing and surrounding said longitudinally extending conduit, the respective openings of said bladder operatively connected to the respective ends of said longitudinally extending conduit, means for introducing a fluid into the cavity formed between said casing and said bladder whereby introduction of said fluid causes said bladder to fold inwardly pivoting about the longitudinal axis of each of said ribs whereby fluid is expelled from said bladder and into said conduit.

2. The pump of claim 1 wherein the exterior surface of said casing defines a cylinder.

3. The pump of claim 1 wherein said ribs are about twice the thickness of said bladder.

4. The pump of claim 1 wherein said ribs are the same thickness as said bladder and are outwardly crimped from said bladder material.

5. The pump of claim 1 wherein the exterior surface of said casing defines the surface of the frustum of a cone and the diameter of one of the hemispherical end sections is greater than the diameter of the other hemispherical end section.

References Cited in the file of this patent

UNITED STATES PATENTS

| | | |
|---|---|---|
| 1,940,516 | Tennant | Dec. 19, 1933 |
| 2,291,912 | Meyers | Aug. 4, 1942 |
| 2,621,608 | McIntyre | Dec. 6, 1952 |
| 2,677,393 | Cornelius | May 4, 1954 |
| 2,760,436 | Von Seggern | Aug. 28, 1956 |